(12) United States Patent
Hohs et al.

(10) Patent No.: US 9,402,189 B2
(45) Date of Patent: Jul. 26, 2016

(54) METHOD AND APPARATUS FOR PROVIDING ACTIVITY-BASED MAP JOB

(71) Applicant: HERE Global B.V., Veldhoven (NL)

(72) Inventors: Cory Hohs, Veldhoven (NL); Jan Peter Richter, Veldhoven (NL); Oliver Fink, Veldhoven (NL); Sian-Kit Tjie, Veldhoven (NL); Reno Marioni, Veldhoven (NL); Nicol Hermann, Veldhoven (NL); Priscila Otero, Veldhoven (NL)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/322,361

(22) Filed: Jul. 2, 2014

(65) Prior Publication Data

US 2016/0007209 A1 Jan. 7, 2016

(51) Int. Cl.
| | |
|---|---|
| *H04W 16/18* | (2009.01) |
| *H04W 4/00* | (2009.01) |
| *H04W 24/08* | (2009.01) |
| *G01C 21/32* | (2006.01) |
| *G06F 17/30* | (2006.01) |
| *G06Q 10/10* | (2012.01) |

(Continued)

(52) U.S. Cl.
CPC .............. *H04W 16/18* (2013.01); *G01C 21/32* (2013.01); *G06F 17/30241* (2013.01); *G06Q 10/101* (2013.01); *G06Q 50/01* (2013.01); *G09B 29/106* (2013.01); *H04W 4/001* (2013.01); *H04W 24/08* (2013.01); *H04W 4/206* (2013.01)

(58) Field of Classification Search
CPC ..... H04W 64/00; H04W 4/021; H04W 4/023; H04W 4/025

USPC ............... 455/456.3, 404.2, 410–411; 370/33
See application file for complete search history.

(56) References Cited

U.S. PATENT DOCUMENTS

| | | | |
|---|---|---|---|
| 8,407,003 B2 | 3/2013 | Geelen et al. | |
| 2007/0027612 A1* | 2/2007 | Barfoot | ................ G05D 1/0297 701/117 |

(Continued)

FOREIGN PATENT DOCUMENTS

| | | |
|---|---|---|
| CN | 102721420 A | 10/2012 |
| JP | 2002213966 A | 7/2002 |
| WO | 2013132031 A1 | 9/2013 |

OTHER PUBLICATIONS

"Amazon Mechanical Turk", Wikipedia, Webpage accessed on Sep. 23, 2014, retrieved from http://en.wikipedia.org/wiki/Amazon_Mechanical_Turk, 7 pages.

(Continued)

*Primary Examiner* — Qun Shen
(74) *Attorney, Agent, or Firm* — Ditthavong & Steiner, P.C.

(57) ABSTRACT

An approach is provided for validating crowd-sourced information. The approach includes processing and/or facilitating a processing of map error data to generate at least one map job and at least one activity context associated with the at least one map job, the map error data, or a combination thereof. The approach also includes determining one or more devices based, at least in part, on the at least one activity context. Further, the approach includes causing, at least in part, a transmission of the at least one map job to the one or more devices for resolving one or more map errors indicated in the at least one map job, the map error data, or a combination thereof.

17 Claims, 12 Drawing Sheets

(51) Int. Cl.
*G06Q 50/00* (2012.01)
*G09B 29/10* (2006.01)
*H04W 4/20* (2009.01)

(56) References Cited

U.S. PATENT DOCUMENTS

| | | | |
|---|---|---|---|
| 2007/0129082 A1* | 6/2007 | Thacher | 455/456.1 |
| 2008/0082225 A1 | 4/2008 | Barrett | |
| 2008/0177469 A1 | 7/2008 | Geelen et al. | |
| 2010/0048307 A1 | 2/2010 | Uhlir et al. | |
| 2010/0131193 A1 | 5/2010 | Shnyr | |
| 2010/0153348 A1 | 6/2010 | Perczynski et al. | |
| 2010/0332118 A1 | 12/2010 | Geelen et al. | |
| 2011/0131172 A1* | 6/2011 | Herzog | G06Q 10/10 706/58 |
| 2011/0313779 A1 | 12/2011 | Herzog et al. | |
| 2013/0104035 A1* | 4/2013 | Wagner et al. | 715/240 |
| 2013/0115972 A1* | 5/2013 | Ziskind et al. | 455/456.2 |
| 2013/0338916 A1 | 12/2013 | Gruijters et al. | |
| 2014/0323163 A1* | 10/2014 | Venkatraman | G01S 5/0252 455/457 |
| 2015/0186443 A1* | 7/2015 | Ito | G06F 17/30356 707/618 |

OTHER PUBLICATIONS

Xu, "Using Volunteer Tracking Information for Activity-Based Travel Demand Modeling and Finding Dynamic Interaction-Based Joint-Activity Opportunities" Master's Thesis, University of Tennessee, 2011, 112 pages.

"How-To: Crowdsourcing Map Data with Amazon's Mechanical Turk", MANGOMAP Blog, accessed on Sep. 23, 2014, retrieved from http://blog.mangomap.com/post/77277170005/how-to-crowdsourcing-map-data-with-amazons-mechanical, 4 pages.

"Ooze Enables Crowdsourced Geospatial Feature and Data Extraction from Imagery", Directions Media Article, accessed on Sep. 23, 2014, retrieved from http://www.primordial.com/documents/DirectionsMagazine.pdf, 10 pages.

"Report Map Changes", Webpage, accessed on Sep. 23, 2014, retrieved from https://www.whereismaps.com/map-corrections.html, 4 pages.

Invitation to Pay Additional Fees and, Where Applicable, Protest Fee for International Application No. PCT/EP2015/064318, mailed Sep. 11, 2015, 7 pages.

Goodchild et al., "Assuring the quality of volunteered geographic information", Spatial Statistics Journal, vol. 1, Mar. 28, 2012, pp. 110-120.

Notification of Transmittal of the International Search Report and the Written Opinion of the International Searching Authority, or the Declaration; International Search Report and Written Opinion of the International Searching Authority or corresponding International Application No. PCT/EP2015/064318, mailed Dec. 14, 2015, 20 pages.

* cited by examiner

750

740

730

METHOD AND APPARATUS FOR PROVIDING ACTIVITY-BASED MAP JOB

BACKGROUND

Service providers and device manufacturers (e.g., wireless, cellular, etc.) are continually challenged to deliver value and convenience to consumers by, for example, providing compelling network services, such as, offering navigation and map services via various user devices. For example, a user may utilize a mobile device or a navigation system in an automobile to search for or access location-based services, navigation information, information about a point of interest (POI), or the like. However, to provide accurate and useful information or services, the maps or navigation systems have to be continuously updated to reflect any changes in the information utilized therein. For example, a map database may be updated to reflect development a new road, a new POI, changes to an existing service center, or the like. In addition to updating and verifying possible changes to information in a map database, some of the information may be erroneous or incomplete and would need to be corrected, completed, and verified. For example, information for a certain POI in a map database may include a physical address, phone number, Internet address, related media items, etc., wherein one or more of the information items may be erroneous or incomplete. However, it is a challenging and resource intensive task for the service or content providers to assure a substantially updated and error free map database. Accordingly, service providers and device manufacturers are challenged to develop new mechanisms to effectively and efficiently validate crowd-sourced information.

SOME EXAMPLE EMBODIMENTS

Therefore, there is a need for an approach for validating crowd-sourced information.

According to one embodiment, a method comprises processing and/or facilitating a processing of map error data to generate at least one map job and at least one activity context associated with the at least one map job, the map error data, or a combination thereof. The method also comprises determining one or more devices based, at least in part, on the at least one activity context. Further, the method comprises causing, at least in part, a transmission of the at least one map job to the one or more devices for resolving one or more map errors indicated in the at least one map job, the map error data, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of map error data to generate at least one map job and at least one activity context associated with the at least one map job, the map error data, or a combination thereof. The apparatus is also caused to determine one or more devices based, at least in part, on the at least one activity context. Further, the apparatus is caused to cause, at least in part, a transmission of the at least one map job to the one or more devices for resolving one or more map errors indicated in the at least one map job, the map error data, or a combination thereof.

According to another embodiment, a computer-readable storage medium carries one or more sequences of one or more instructions which, when executed by one or more processors, cause, at least in part, an apparatus to process and/or facilitate a processing of map error data to generate at least one map job and at least one activity context associated with the at least one map job, the map error data, or a combination thereof. The apparatus is also caused to determine one or more devices based, at least in part, on the at least one activity context. Further, the apparatus is caused to cause, at least in part, a transmission of the at least one map job to the one or more devices for resolving one or more map errors indicated in the at least one map job, the map error data, or a combination thereof.

According to another embodiment, an apparatus comprises means for processing and/or facilitating a processing of map error data to generate at least one map job and at least one activity context associated with the at least one map job, the map error data, or a combination thereof. The apparatus also comprises means for determining one or more devices based, at least in part, on the at least one activity context. Further, the apparatus comprises means for causing, at least in part, a transmission of the at least one map job to the one or more devices for resolving one or more map errors indicated in the at least one map job, the map error data, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for validating crowd-sourced information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
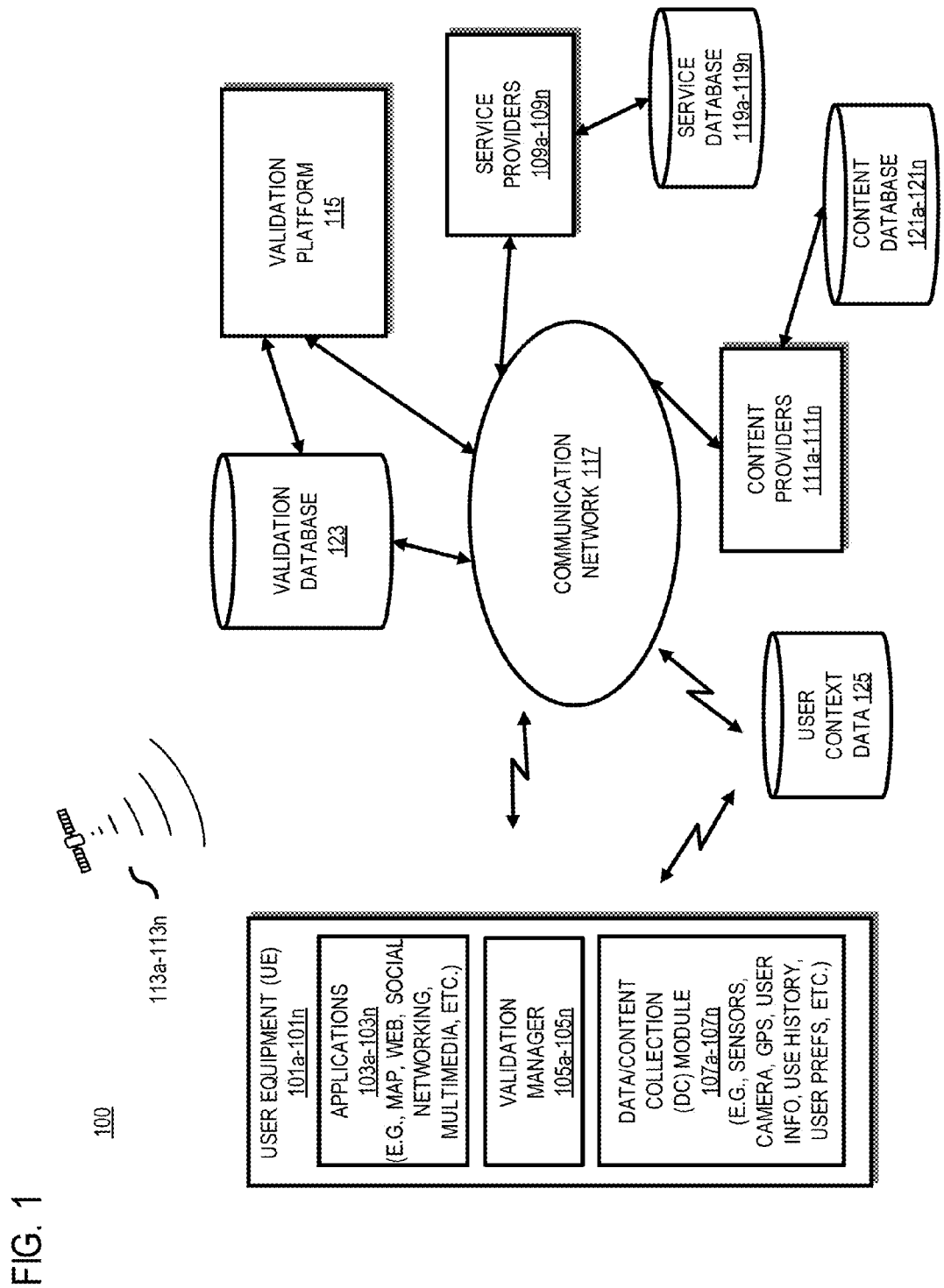
FIG. 1 is a diagram of a system capable of validating crowd-sourced information, according to one embodiment.

FIG. 1 is a diagram of a system capable of validating crowd-sourced information, according to one embodiment. As discussed above, data utilized by any of a number of navigation tools and map applications are often out of date or contain incomplete data, and updating such data may prove cumbersome with less than reliable results. Some traditional approaches have allowed users to report updates to the data, for example into a map database, where the reported data may be shared with other users or user communities. In some cases, such updates may not be accurate or reliable and may conflict with updates/reports provided by other users. Further, the accuracy of such data updates is dependent upon the reliability of a reporting source. However, service or content providers receiving or maintaining a database that includes crowd-sourced data may not be able to validate the crowd-sourced data in a timely and effective manner.

To address this problem, a system 100 of FIG. 1 introduces the capability for validating crowd-sourced information (e.g., location or POI data) across a variety of use cases and applications by maximizing data offerings by reliable sources and minimizing errant data updates. The system 100 introduces an approach for integrated validation of crowd-sourced data updates by managing the processes for aggregating data error reports received from users or service providers, creating one or more data update tasks (map jobs) that users or a service providers may perform, mechanisms for validating data updates that may be reported by various users or service providers, updating the database with validated data, and communicate update status and related information to users or service providers.

In one embodiment, an aggregator may receive and aggregate feedback, e.g., reports of various types of data errors, that can originate from users or user devices that participate in providing the feedback. In one scenario, an error report may be for an erroneous information item or a missing information item that is associated with an instance of data in a database. For example, the data error may be associated with a data entry for a certain location in a map or a POI in the database. In one scenario, a user device may utilize an application programming interface (API) (e.g., a map-feedback API (MFAPI)) to interface with the aggregator (e.g., in a platform). As noted, a data error may be reported by a user device or by an internal database rule that can trigger a report of a data error. For example, the error reports may include a report of a missing Internet link error associated with a POI, a request to verify certain data in the same area as the POI, an error report for location information of another POI in the same area, or the like. In one embodiment, the aggregator may use a map job (MJ) creation flow, which may include an analysis of each of a plurality of error reports and substantially automatically grouping the reports into one or more MJs. In various scenarios, the grouping of the errors may be based on an error type, geo-location associated with the error, reporting user or user device, validation threshold rating, priority, or the like. In one embodiment, for a given MJ, a validation threshold may be based on a number of agreeing submissions (votes) per user type that may render a MJ as being resolved. In one embodiment, a MJ with its common attributes and a validation threshold may be packaged and submitted for distribution, consideration, and resolution.

In one embodiment, at least one element of the system 100, e.g., a distribution logic may create a list/queue of one or more MJs that can be distributed to users or service providers for consideration or completion. For example, the MJs may be distributed to navigation devices (e.g., personal, integrated in an automobile, etc.), mobile devices (e.g., phones, tablets, laptops, etc.), or the like, which may utilize an MFAPI or an application suitable for providing data updates. In one embodiment, an MJ may be associated with a geo-location attribute, wherein the system 100 may also determine a geo-fence attribute for the MJ. In one scenario, an MJ may indicate that for updating/validating an error in the MJ, a user/user-device is to be at the same geo-location as indicated by the MJ or be within its geo-fence attribute. In one embodiment, an MJ is presented at a user device only when location information of the user device is substantially the same as the geo-location attribute of the MJ or when the user device is located within the geo-fence attribute (e.g., within one mile) of the MJ. In one embodiment, MJs may be distributed (e.g., pushed) to one or more user devices, wherein the MJs may be queued to be resolved. For example, an MJ for a POI phone number error may be distributed to a web portal or a mobile device, which may present a visual user interface prompt on a map application. In this example, the user may interact/resolve the MJ whenever he wishes so (e.g., no requirement for the user to be in the area indicated by the MJ).

In one embodiment, the system 100, e.g., a validation/threshold logic may monitor responses to an MJ that may have been received from various users or service providers. Further, the response may be compared to each other in order to determine if they match. For example, five responses to an MJ for a phone number of a certain POI are compared to see if the phone reported phone numbers match. In one scenario, if the number of matching responses meet a validation threshold, then the MJ may be considered resolved. For example, the threshold may require that at least four reported phone numbers are to match in order to qualify as a validated resolution to the associated MJ. Upon a validated resolution of the MJ, the MJ may be tagged as resolved or automatically closed and any related individual error reports may be closed as well. In one embodiment, a notification of a resolution of a reported error may be communicated to one or more users who had reported the error. In one embodiment, one or more users who provided information for resolving a reported error may be awarded with some credit points at one or more user accounts; for example, an account with the entity receiving the error correction, an online social network account, a service/content provider account, or the like. In one example, the amount of awarded points may be based on user history, reliability of reported solutions, user trust level, the type of corrected error, priority of the corrected error, or the like parameters.

As shown in FIG. 1, in one embodiment, the system 100 includes user equipment (UE) 101a-101n (also collectively referred to as UE 101 and/or UEs 101), which may be utilized to execute one or more applications 103a-103n (also collectively referred to as applications 103) including a map application, social networking, web browser, content sharing, multimedia applications, augmented reality (AR), virtual reality (VR), user interface (UI), web client, etc. In various embodiments, the applications 103 may be utilized to capture, process, submit, analyze, append, tag, etc. various location information, media items, POI information, or the like.

In one embodiment, a UE 101 may be configured with a validation manager 105a-105n (also collectively referred to as validation manager 105) for reporting potential data errors associated with an application or a database (e.g., a map application or database). Additionally, the validation manager may be utilized to receive, request, or to respond to an MJ, for example, by capturing and providing information related to the MJ for validating crowd-sourced information.

In one embodiment, the UEs 101 may include data/content collection modules 107a-107n (also collectively referred to as DC module 107) for determining and/or collecting data and/or content associated with the UEs 101, one or more users of the UEs 101, applications 103, validation manager 105, one or more information items (e.g., about a location, POI, etc.), or the like. In addition, the UEs 101 can execute an application 103 that is a software client for storing, processing, and/or forwarding one or more information items to other components of the system 100. In one example, the validation manager 105 may perform some or all of its tasks in conjunction with the applications 103 or the DC module 107.

Additionally, the applications 103 may facilitate communication with other UEs 101, one or more service providers 109a-109n (also collectively referred to as service providers 109), one or more content providers 111a-111n (also collectively referred to as content providers 111), one or more GPS satellites 113a-113n (also collectively referred to as GPS satellites 113), a validation platform 115, or with other components of the system 100 directly or via a communication network 117. In addition or alternatively, the UE 101 has connectivity to the validation platform 115 via the communication network 117 for performing all or a portion of the validation of the crowd-sourced information.

In one embodiment, the service providers 109 may include and/or have access to one or more service databases 119a-119n (also collectively referred to as service database 119), which may include various user information, user profiles, user preferences, one or more profiles of one or more user devices (e.g., device configuration, sensors information, etc.), service providers 109 information, other service providers' information, and the like. In one embodiment, the service providers 109 may include one or more service providers offering one or more services, for example, online shopping, social networking services (e.g., blogging), content sharing, media upload, media download, media streaming, account management services, or a combination thereof. Further, the service providers 109 may conduct a search for content items, media items, information, coupons, and the like associated with one or more users, POIs, geo-locations, and the like. In one embodiment, a service provider 109 may receive and process a request/input from a user for determining status information associated with one or more elements present in one or more media items. In one embodiment, the service provider 109 may utilize various algorithms, software applications, modules, hardware, firmware, and the like for processing, recognizing, detecting, comparing, and the like, content items (e.g., media items) that may be associated with a user, a user device, or the like.

In one embodiment, the content providers 111 may include and/or have access to one or more content database 121a-121n (also collectively referred to as content database 121), which may store, include, and/or have access to various content items. For example, the content providers 111 may store content items (e.g., at the content database 121) provided by various users, various service providers, crowd-sourced content, and the like. Further, the service providers 109 and/or the content providers 111 may utilize one or more service application programming interfaces (APIs)/integrated interface, through which communication, media, content, and information (e.g., associated with users, applications, services, content, etc.) may be shared, accessed and/or processed.

In various embodiments, the service providers 109 and/or the content providers 111 may include and/or have access to information associated with people, POIs, objects, etc. For example, the information may be available from various public, private, or government controlled databases, which may be accessed via the communication network 117.

In one embodiment, the validation platform 115 may receive and process various information associated with a data error and resolution data for validating crowd-sourced information. The validation platform functions and elements are discussed in relation to FIG. 2.

The system 100 may also include user context data 125. The user context data may include user events, user content items, location-based context data (e.g., time stamps, etc.). For example, the context data contains environment data, weather data, traffic data, event data, commuter data, etc. As an example, the user contextual data of a user interested in technology or gadgets may be associated with electronics stores, wireless hot spots in the city, computer conventions, forums of technologies, science museums, media laboratories, etc. The service providers 109 may collect, assemble, store, update, and/or supply the context data and user context data. In one embodiment, user context data, for example, user events may be extracted from calendars, emails, voice messages, text messages, blogs, bulletin boards, discussion forums, geographic information systems, and social network websites. In one embodiment, user content items may be used to infer context data and may be retrieved from, for instance, personal photo albums, media libraries, playlists, etc. In one embodiment, a validation platform 115 processes the context data or user context data of different formats and types including data derived from various forms of communication such as emails, text messages, voice messages, calls, video/audio clips, etc.

The UEs 101 may be any type of mobile terminal, fixed terminal, or portable terminal including a mobile handset, station, unit, device, personal navigation device, connected built-in or standalone navigation device in a vehicle, web surfing device, healthcare diagnostic and testing devices, product testing devices, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, loud speakers, display monitors, radio broadcast receiver, electronic book device, game device, wrist watch, or any combination thereof, including the accessories and peripherals of these devices, or any combination thereof. It is also contemplated that the UEs can support any type of interface to the user (such as "wearable" circuitry, etc.) Further, the UEs 101 may include various sensors for collecting data associated with a user, a user's environment, and/or with a UE 101, for example, the sensors may determine and/or capture audio, video, images, atmospheric conditions, device location, user mood, ambient lighting, user physiological information, device movement speed and direction, and the like.

In one embodiment, the UE 101 includes a location module/sensor that can determine the UE 101 location (e.g., a user's location). The UE 101 location may be determined by a triangulation system such as a GPS, assisted GPS (A-GPS), Cell of Origin, wireless local area network triangulation, or other location extrapolation technologies. Standard GPS and A-GPS systems can use the one or more satellites 113 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module/sensor may also utilize multiple technologies to detect the location of the UE 101. GPS coordinates can provide finer detail as to the location of the UE 101. In another embodiment, the UE 101 may utilize a local area network (e.g., LAN, WLAN) connection to determine the UE 101 location information, for example, from an Internet source (e.g., a service provider).

By way of example, the communication network 117 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UEs 101, the service providers 109, the content providers 111, or the validation platform 115 may communicate with each other and other components of the communication network 117 using well known, new or still developing protocols. In this context, a protocol includes a set of rules defining how the network nodes within the communication network 117 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the UEs 101, the service providers 109, the content providers 111, and the validation platform 115 may interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. It is also noted that the role of a client and a server is not fixed; in some situations a device may act both as a client and a server, which may be done simultaneously and/or the device may alternate between these roles.

Figure 2:
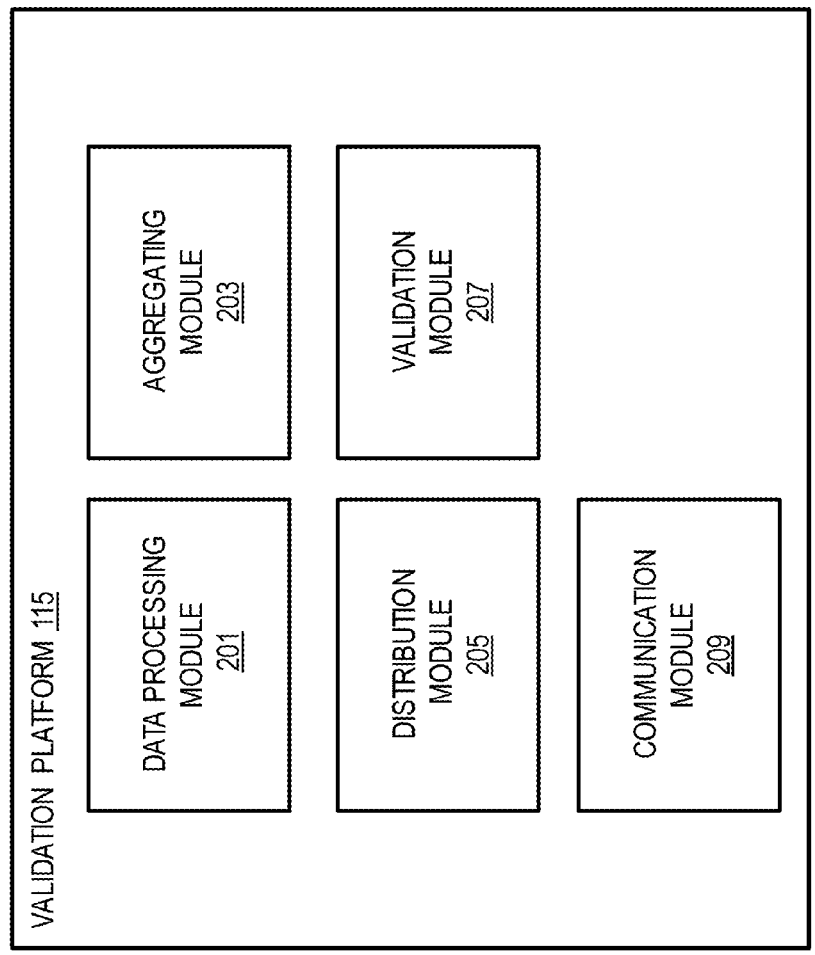
FIG. 2 is a diagram of the components of validation platform, according to one embodiment.

FIG. 2 is a diagram of the components of a validation platform 115, according to one embodiment. By way of example, the validation platform 115 is a network component (e.g., a database managing system, servers, etc.) that includes one or more components utilized for receiving, grouping, and distribution of data error reports. Further, the validation platform can receive feedback data for updating/correcting the erroneous data. Also, the validation platform can determine a threshold level for validating the feedback data, which may then be made available for use by users, service providers, content providers, or the like. It is contemplated that the functions of these components may be combined in one or more components or performed by other components of equivalent functionality. In this embodiment, the validation platform 115 includes a data processing module 201, an aggregation module 203, a distribution module 205, a validation module 207, and a communication module 209.

In one embodiment, the data processing module 201 may receive reports/feedback of various types of data errors, which may be by users or user devices that participate in providing the feedback. In one embodiment, user information may be utilized to determine a geographical area associated with the user or his device. In some embodiments, personal detail information is processed to determine reliability information associated with the user or the user device. In various scenarios, the data errors may be processed to determine the types of error, priority level, frequency of the same error reported by other users, the information that may be required to correct the error, or the like. In one embodiment, the processing module may determine location information associated with a report of data error, for example, by analyzing information or attributes associated with the data error. In one embodiment, the processing module may operate in conjunction with the validation module for processing and analyzing resolution data received from one or more users in response to an MJ. In one embodiment, the processing module may determine reliability information associated with a user reporting a data error or submitting resolution data in response to an MJ.

In one embodiment, the aggregating module 203 may use an MJ creation flow, which may include an analysis of each of a plurality of error reports or the data from the processing module 201, to create an MJ as well as generate activity context associated with the MJ. In one embodiment, the activity context may be determined based on the data error report and one or more activities that a user or a user device should be associated with when providing feedback data for resolving a targeted MJ. In one embodiment, the aggregating module may include in an MJ an attribute that a user device should be located near the location of a POI that is indicated in MJ.

In one embodiment, the distribution module 205 may create a list/queue of MJs that can be distributed to users or service providers for consideration or resolution. For example, the MJs may be distributed to navigation devices (e.g., personal, integrated in an automobile, etc.), mobile devices (e.g., phones, tablets, laptops, etc.), or the like, which may utilize an MFAPI or an application suitable for providing data updates. Further, the MJs may be distributed based on the activity context, device capability, user schedule, or the like. In one embodiment, an MJ may include a geo-fencing information for triggering a presentation of the at least one map job at the one or more devices. In one scenario, an MJ may indicate that for updating/validating an error in the MJ, a user/user-device is to be at the same geo-location as indicated by the MJ or be within its geo-fence attribute. In one embodiment, an MJ is presented at a user device only when location information of the user device is substantially the same as the geo-location attribute of the MJ or when the user device is located within the geo-fence attribute (e.g., within one mile) of the MJ. In one embodiment, MJs may be distributed (e.g., pushed) to one or more user devices, wherein the MJs may be queued to be resolved. For example, an MJ for a POI phone number error may be distributed to a web portal or a mobile device, which may present a visual user interface prompt on a map application.

In one embodiment, the validation module 207 may receive one or more responses from various users or service providers, where the responses may include one or more information items for resolving an MJ. In one embodiment, a map resolution data include, at least in part, image data, video data, audio data, or a combination thereof to confirm that the at least one map job has been resolved. In one embodiment, the resolution data may have been submitted via a validation manager 105 application at a UE 101, wherein the submission may have been substantially automatic via a UE 101, or it may include user input.

In one embodiment, the communication module 209 can be used to communicate with one or more entities of the system 100. Certain communications can be via methods such as an internet protocol, messaging (e.g., SMS, MMS, etc.), or any other communication method (e.g., via the communication network 117). In some examples, the validation platform can receive and send information about data error reports, MJs, user queries, service provider requests, or the like.

Figure 3:
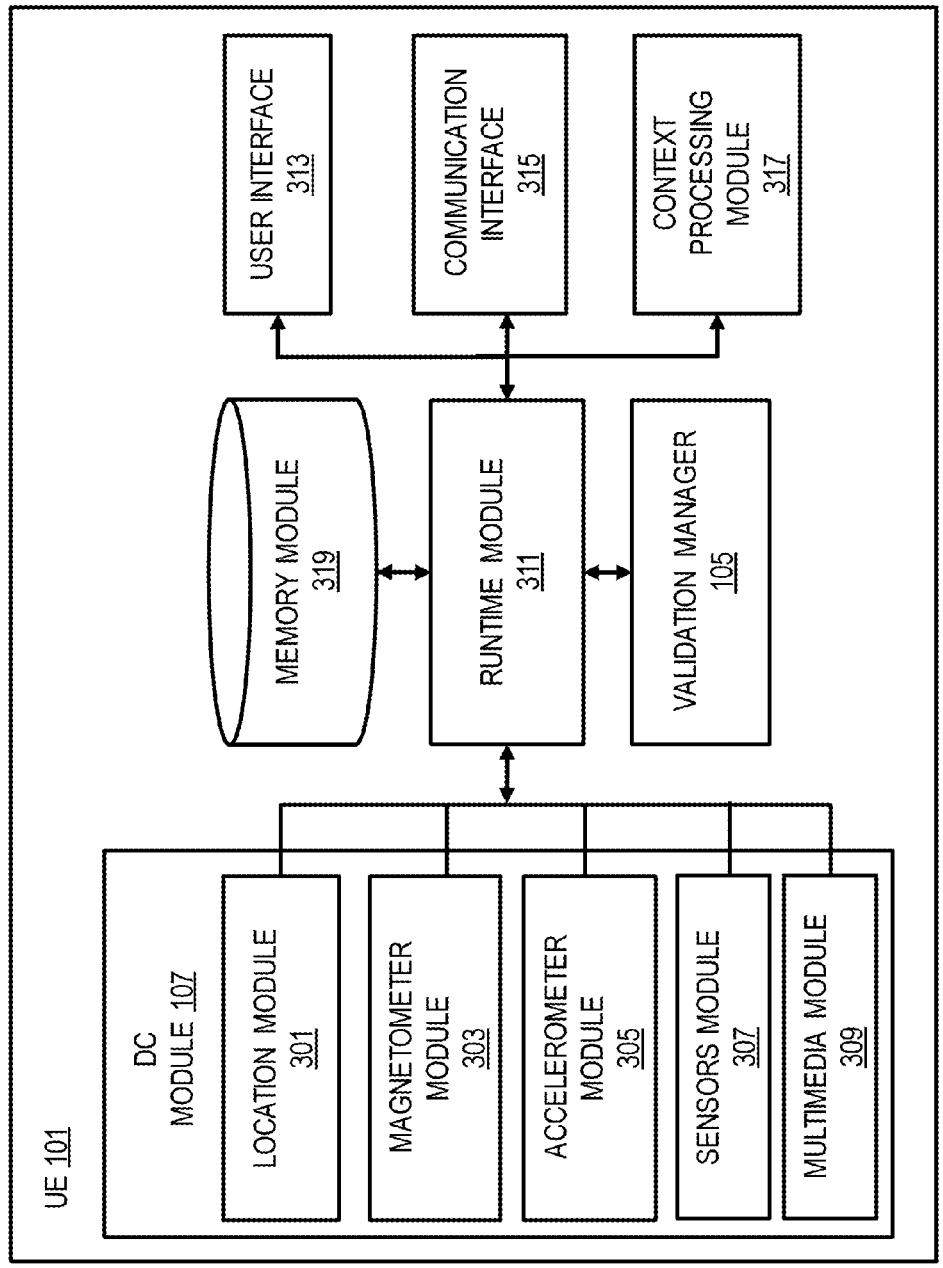
FIG. 3 is a diagram of the components of a user equipment, according to an embodiment.

FIG. 3 is a diagram of the components of a user equipment capable of communicating with one or more entities of a communication system, according to an embodiment. By way of example, a UE 101 includes one or more components for receiving and transmitting communication information including media content, textual messages, location information, and the like. It is contemplated that the functions of these components may be combined in one or more components or performed by other components of equivalent functionality. In this embodiment, the UE 101 includes a DC module 107 that may include one or more location modules 301, magnetometer modules 303, accelerometer modules 305, sensors module 307, and multimedia module 309. Further, the UE 101 may also include a runtime module 311 to coordinate the use of other components of the UE 101, a user interface 313, a communication interface 315, a context processing module 317, and a memory module 319. The applications 103 and the validation manager 105 can execute on the runtime module 311 utilizing the components of the UE 101.

The location module 301 can determine a user's location, for example, via location information associated with a UE 101. The user's location can be determined by a triangulation system such as GPS, assisted GPS (A-GPS), Cell of Origin, or other location extrapolation technologies. Standard GPS and A-GPS systems can use satellites 113 to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 301 may also utilize multiple technologies to detect the location of the UE 101. Location coordinates (e.g., GPS coordinates) can give finer detail as to the location of the UE 101 when media is captured. In one embodiment, GPS coordinates are stored as context information in the memory module 319 and are available to the context processing module 317, DC module 107, validation platform 115, service providers 109, or to other entities of the system 100 (e.g., via the communication interface 315.) Moreover, in certain embodiments, the GPS coordinates can include an altitude to provide a height. In other embodiments, the altitude can be determined using another type of altimeter. In certain embodiments, the location module 301 can be a means for determining a location of the UE 101, an image, or used to associate an object in view with a location.

The magnetometer module 303 can be used in finding horizontal orientation of the UE 101. A magnetometer is an instrument that can measure the strength and/or direction of a magnetic field. Using the same approach as a compass, the magnetometer is capable of determining the direction of a UE 101 using the magnetic field of the Earth. The front of a media capture device (e.g., a camera) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer can be stored in memory module 319, made available to other modules and/or applications 103 of the UE 101, and/or transmitted via the communication interface 315 to one or more entities of the system 100.

The accelerometer module 305 can be used to determine vertical orientation of the UE 101. An accelerometer is an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 305 can determine the angle the UE 101 is pointed as compared to Earth's gravity. In certain embodiments, the magnetometer module 303 and accelerometer module 305 can be means for ascertaining a perspective of a user. This perspective information may be stored in the memory module 319, made available to other modules and/or applications 103 of the UE 101, and/or sent to one or more entities of the system 100.

In various embodiments, the sensors module 307 can process sensor data from various sensors (e.g., GPS, accelerometer, gyroscope, thermometer, etc.) to determine environmental (e.g., atmospheric) conditions surrounding the UE 101, user mood (e.g., hungry, angry, tired, etc.), location information, and various other information from a range sensors that may be available on one or more devices. For example, the sensors module 307 may detect conditions including humidity, temperature, geo-location, biometric data of the user, etc. Once again, this information can be stored in the memory module 319 and sent to the context processing module 317 and/or to other entities of the system 100. In certain embodiments, information collected from the DC module 107 can be retrieved by the runtime module 311 and stored in memory module 319, made available to other modules and/or applications 103 of the UE 101, or sent to one or more entities of the system 100.

In one embodiment, the multimedia module 309 may be utilized to capture various media items, for example, graphical encoded data representations, images, video, audio, and the like, wherein the captured media may be submitted to one or more modules and applications of the UE 101, a service provider, and/or a content provider for further processing, storage, sharing, and the like. For example, a captured image of a graphical encoded data representations may be submitted to a service provider and/or the context processing module 317 for analysis and/or decoding. In one embodiment, the multimedia module 309 may also be utilized to process various media items for determining location information associated with a media content item. For example, a media item may be a picture that may include images of people, POIs, objects, buildings, etc. In one embodiment, the multimedia module 309 may use one or more image processing algorithms for processing a media item and for identifying one or more elements present into media item.

The user interface 313 can include various methods of communication. For example, the user interface 313 can have outputs including a visual component (e.g., a screen), an audio component, a physical component (e.g., vibrations), and other methods of communication. User inputs can include a touch-screen interface, a scroll-and-click interface, a button interface, a microphone, etc. Input can be via one or more methods such as voice input, textual input, typed input, typed touch-screen input, other touch-enabled input, etc.

In one embodiment, the communication interface 315 can be used to communicate with one or more entities of the system 100. Certain communications can be via methods such as an internet protocol, messaging (e.g., SMS, MMS, etc.), or any other communication method (e.g., via the communication network 117). In some examples, the UE 101 can send context information associated with the UE 101 to the service providers 109, content providers 111, validation platform 115, or to other entities of the system 100.

The context processing module 317 may be utilized in determining context information from the DC module 107 or applications 103 executing on the runtime module 311. This information may be caused to be transmitted, via the communication interface 315, to the validation platform 115, service providers 109 or to other entities of the system 100. The context processing module 317 may additionally be utilized as a means for determining information related to the user, an instance of data, a value, a content item, an object, a subject, and the like. In certain embodiments, the context processing module 317 can infer higher level context information from the context data such as favorite locations, significant places, common activities, interests in products and services, POIs at various geo-locations, etc.

Figure 4:
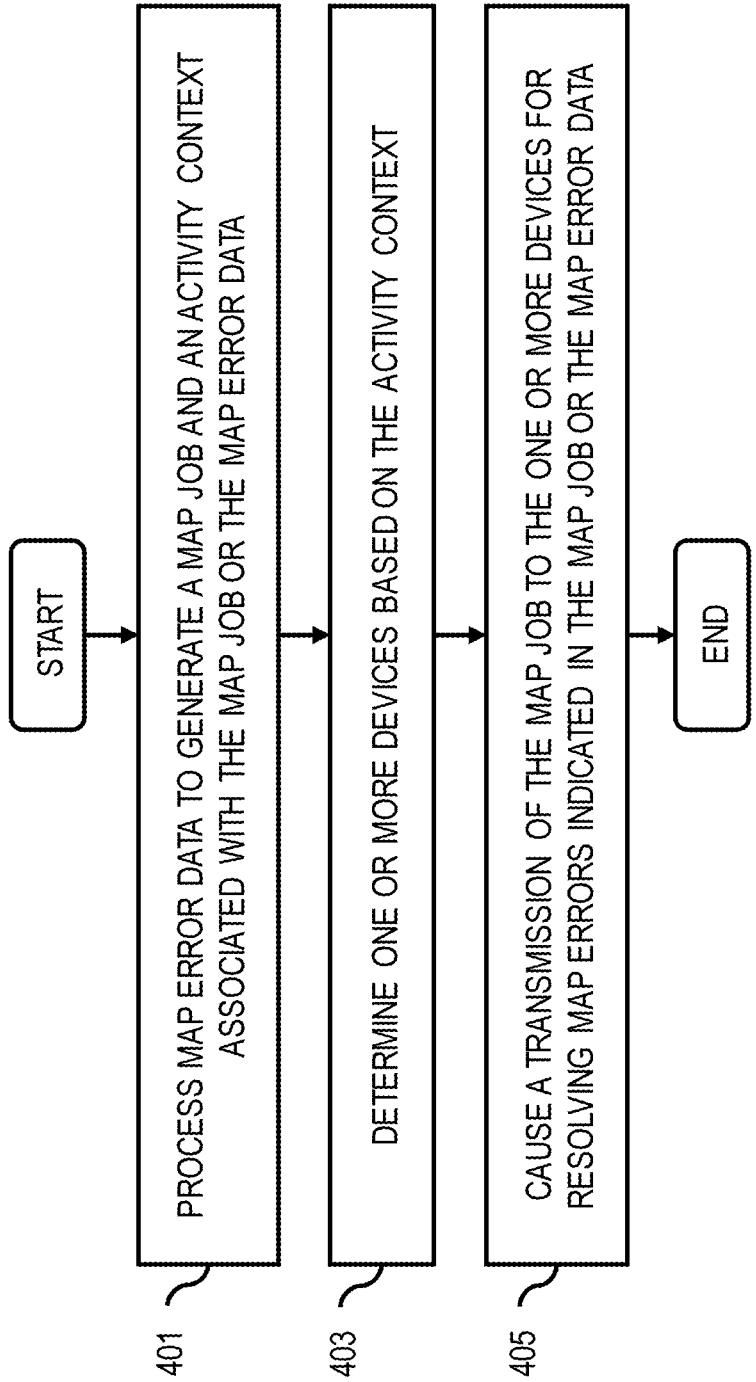
FIGS. 4 and 5 are flowcharts of processes for validating crowd-sourced information, according to one embodiment.
Figure 5:
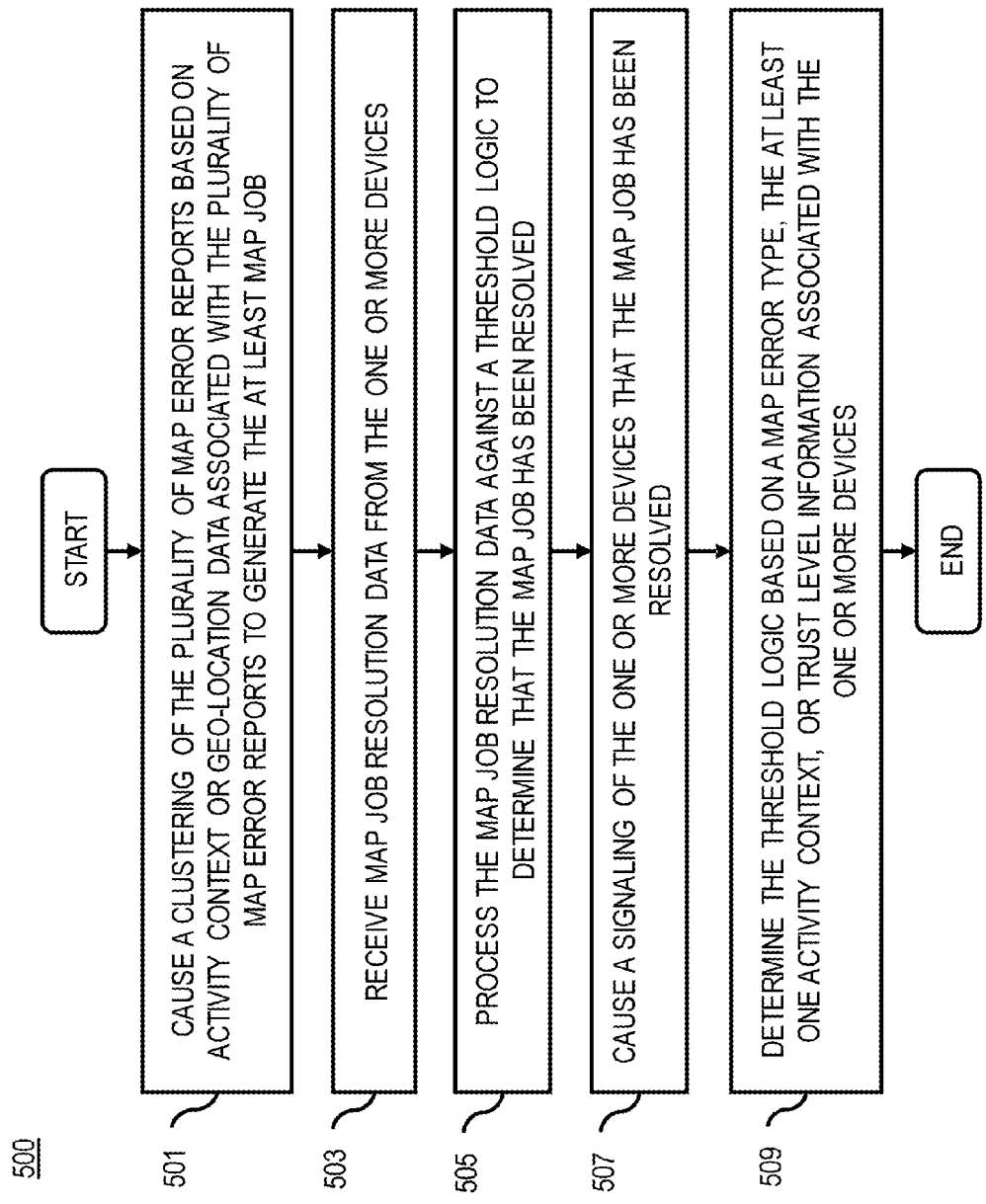
Figure 10:
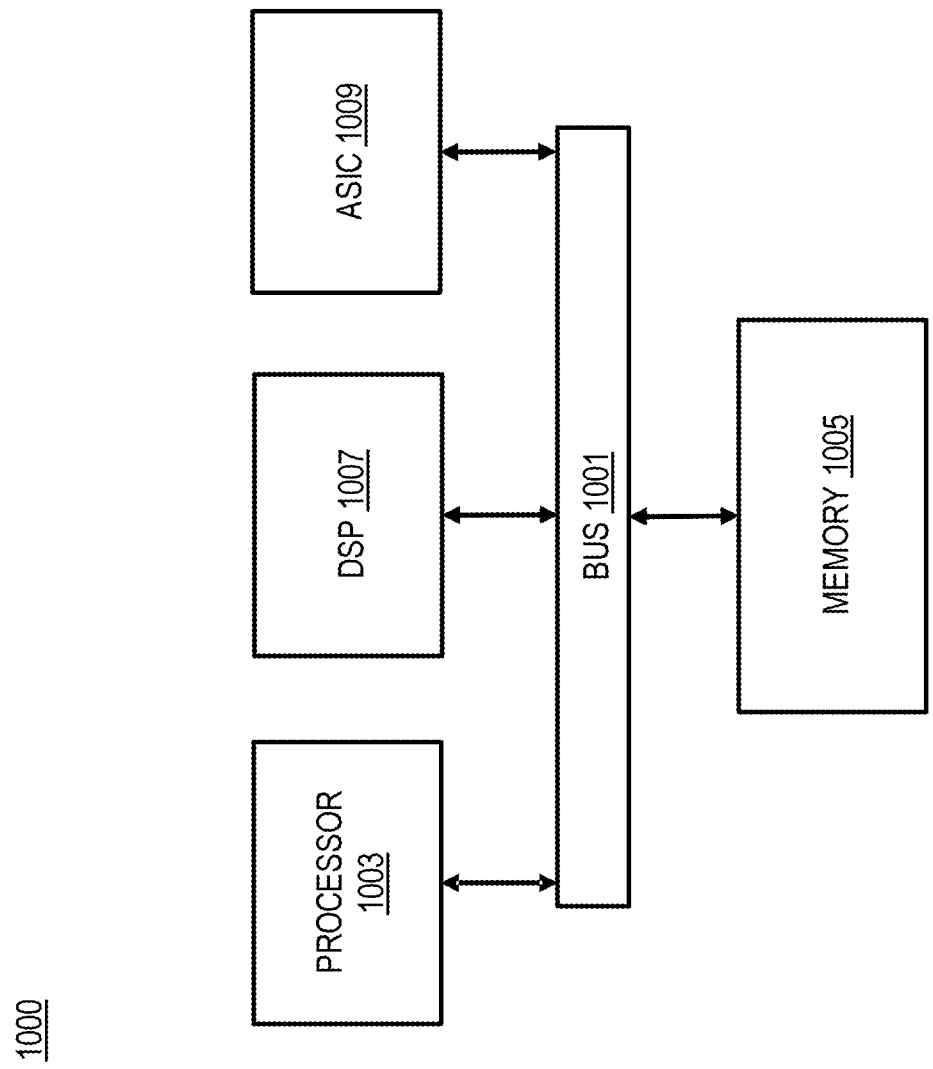
FIG. 10 is a diagram of a chip set that can be used to implement an embodiment of the invention.

FIGS. 4 and 5 are flowcharts of various processes for, at least, validating crowd-sourced information, according to various embodiments. In various embodiments, validation platform 115 may perform one or more portions of the processes 400 and 600, which may be implemented in, for instance, a chip set including a processor and a memory as shown in FIG. 10. As such, the validation platform 115 can provide means for accomplishing various parts of the process 400 and 500 as well as means for accomplishing other processes in conjunction with other components of the system 100. Further, for clarity in discussing the processes 400 and 500, the validation platform 115 is referred to as completing various steps of said processes; however, said processes or example steps described therein, which may include optional steps, may be performed by one or more components of the system 100 in any suitable order.

Referring to FIG. 4, the process 400 may being at step 401 where the validation platform may process and/or facilitate a processing of map error data to generate at least one map job and at least one activity context associated with the at least one map job, the map error data, or a combination thereof. In one embodiment, the data processing module 201 may receive reports/feedback of various types of data errors that can originate from users or user devices that participate in providing the feedback. In one scenario, an error report may be for an erroneous information item or a missing information item that is associated with an instance of data in a database. For example, the data error may be associated with a data entry for a certain location in a map or a POI in the database. In one scenario, a user device may utilize MFAPI to interface with the validation platform for providing the data error feedback. Also, a data error may be reported by a user device or by an internal database rule that can trigger a report of a data error. For example, the error reports may include a report of a missing Internet link error associated with a POI, a request to verify certain data in the same area as the POI, an error report for location information of another POI in the same area, or the like. In one embodiment, the aggregating module 203 may use an MJ creation flow, which may include an analysis of each of a plurality of error reports, to create an MJ as well as generate activity context associated with the MJ. In one embodiment, the activity context may be determined based on the data error report and one or more activities that a user or a user device should be associated with when providing feedback data for resolving a targeted MJ. In one embodiment, the at least one activity context includes, at least in part, a mode of transport, an activity associated with at least one user of at least one device reporting the map error data, or a combination thereof. For example, an MJ may include an attribute that a user device should be located near the location of a POI that is indicated in MJ. In one example, the activity context may indicate that an MJ is to be presented to a user if the user is biking, hiking, driving, running, at a certain restaurant at dinner time, en route to an airport, travelling by train, or the like. In various embodiments, an MJ may be data for indoor or outdoor POIs and locations.

In step 403, the validation platform may determine one or more devices based, at least in part, on the at least one activity context. In one embodiment, a distribution module 211 may create a list/queue of MJs that can be distributed to users or service providers for consideration or resolution. For example, the MJs may be distributed to navigation devices (e.g., personal, integrated in an automobile, etc.), mobile devices (e.g., phones, tablets, laptops, etc.), or the like, which may utilize an MFAPI or an application suitable for providing data updates. Further, the MJs may be distributed based on the activity context. In one embodiment, the at least one map job includes, at least in part, geo-fencing information for triggering a presentation of the at least one map job at the one or more devices. In one scenario, an MJ may indicate that for updating/validating an error in the MJ, a user/user-device is to be at the same geo-location as indicated by the MJ or be within its geo-fence attribute. In one embodiment, an MJ is presented at a user device only when location information of the user device is substantially the same as the geo-location attribute of the MJ or when the user device is located within the geo-fence attribute (e.g., within one mile) of the MJ. In one embodiment, MJs may be distributed (e.g., pushed) to one or more user devices, wherein the MJs may be queued to be resolved. For example, an MJ for a POI phone number error may be distributed to a web portal or a mobile device, which may present a visual user interface prompt on a map application. In this example, the user may interact/resolve the MJ whenever he wishes so (e.g., no requirement for the user to be in the area indicated by the MJ). For example, an MJ may be associated with an indoor shopping center where its activity context may indicate that the MJ is to be presented at a user device if it is determined that the user is shopping at the shopping center, for example, via UE sensor data.

In step 405, the validation platform may cause, at least in part, a transmission of the at least one map job to the one or more devices for resolving one or more map errors indicated in the at least one map job, the map error data, or a combination thereof. In various embodiments, the distribution module may cause a communication of an MJ to one or more user devices, one or more service providers (e.g., web sites, social network sites, etc.), wherein the communication may be effectuated via a short messaging service (SMS), an Internet link, a prompt via one or more applications at a UE 101 (e.g., application 103, validation manager 105, etc.), or the like. In one scenario, an MJ may be tagged to indicate a priority level, a bonus/award level, an expiration time, or the like, wherein a user may be able to readily see the tag for a timely/quick response.

Referring to FIG. 5, the process 500 may being at step 501 wherein the map error data includes a plurality of map error reports from a plurality of reporting devices, the validation platform may cause, at least in part, a clustering of the plurality of map error reports based, at least in part, on the at least one activity context, geo-location data associated with the plurality of map error reports, or a combination thereof to generate the at least map job. In one embodiment, the aggregating module 203 may use an MJ creation flow, which may include an analysis of each of a plurality of error reports, to automatically group the error reports into one or more MJs. In various scenarios, the grouping of the error reports may be based on an error type, an activity context, a geo-location associated with the error, a reporting user or user device, a validation threshold rating, a priority level, or the like.

In step 503, the validation platform may receive map job resolution data from the one or more devices. In one embodiment, the validation module 207 may receive one or more responses from various users or service providers, where the responses may include one or more information items for resolving an MJ. In one embodiment, the map resolution data include, at least in part, image data, video data, audio data, or a combination thereof to confirm that the at least one map job has been resolved. In one embodiment, the resolution data may be submitted via a validation manager 105 application at a UE 101, wherein the submission may be substantially automatic via a UE 101, or it may include user input. For example, a navigation system may determine location information of a POI in an MJ and provide an automated response that includes the location information. In one scenario, a user may interact with an MJ on a map application and provide information for resolving a missing data point associated with a POI in the MJ.

In step 505, the validation platform may process and/or facilitate a processing of the map job resolution data against at least one threshold logic to determine that the at least one map job has been resolved. In one embodiment, the at least one threshold logic includes, at least in part, one or more rules, one or more criteria, or a combination thereof for determining that the at least one map job has been resolved. In one embodiment, a plurality of resolution data instances may be compared to each other in order to determine if they match. For example, 10 responses to an MJ for verifying a new hiking or bicycle trail are compared to see if information (e.g., pictures, address, trail number, etc.) in the reported responses are similar or match. For example, the threshold logic may indicate that at least four of the reported resolution data instances are to match in order to qualify as a validated resolution to the associated MJ. In one scenario, if the number of matching responses meet a validation logic, then the MJ may be considered resolved.

In step 507, the validation platform may cause, at least in part, a signaling of the one or more devices that the at least one map job has been resolved. In one embodiment, the signaling initiates a removal of the at least one map job from at least one job queue of the one or more devices. In one scenario, upon a validated resolution of an MJ, the MJ may be tagged as resolved or automatically closed as well as any related individual error reports may be closed. In one embodiment, a notification of a resolution may be communicated to one or more users who had reported the error. For example, the communication may be via an SMS message, an Internet link, a prompt via one or more applications at a UE 101 (e.g., application 103, validation manager 105, etc.), or the like. In one embodiment, one or more users who provided information for resolving a reported error may be awarded with some credit points at one or more user accounts; for example, an account with the entity receiving the error correction, an online social network account, a service/content provider account, or the like. In one example, the amount of awarded points may be based on user history, reliability of reported solutions, user trust level, the type of corrected error, priority of the corrected error, or the like parameters.

In step 509, the validation platform may determine the threshold logic based, at least in part, on a map error type, the at least one activity context, trust level information associated with the one or more devices, or a combination thereof. In one embodiment, the validation module 207 may utilize various information items for determining a threshold level, which may be utilized in validating a resolution of an MJ. In various embodiments, a threshold logic/value/level may be based on a sensitivity level of the required data for resolving an MJ, priority level of an MJ, reliability of past MJ responses provided by the user or user device reporting a new solution, user trust level, the type of data to be corrected, or the like. For example, an MJ requiring resolution data from inside a restaurant may require that a minimum number of resolution reports are to include a media item captured in the restaurant. In one example, a high priority MJ may have a lower threshold logic since there may be no other data to compare with. In one example, resolution data received from a user who has obtained a certain trust level with a service provider may be validated by itself or when compared with a minimum number of other resolution data.

Figure 6:
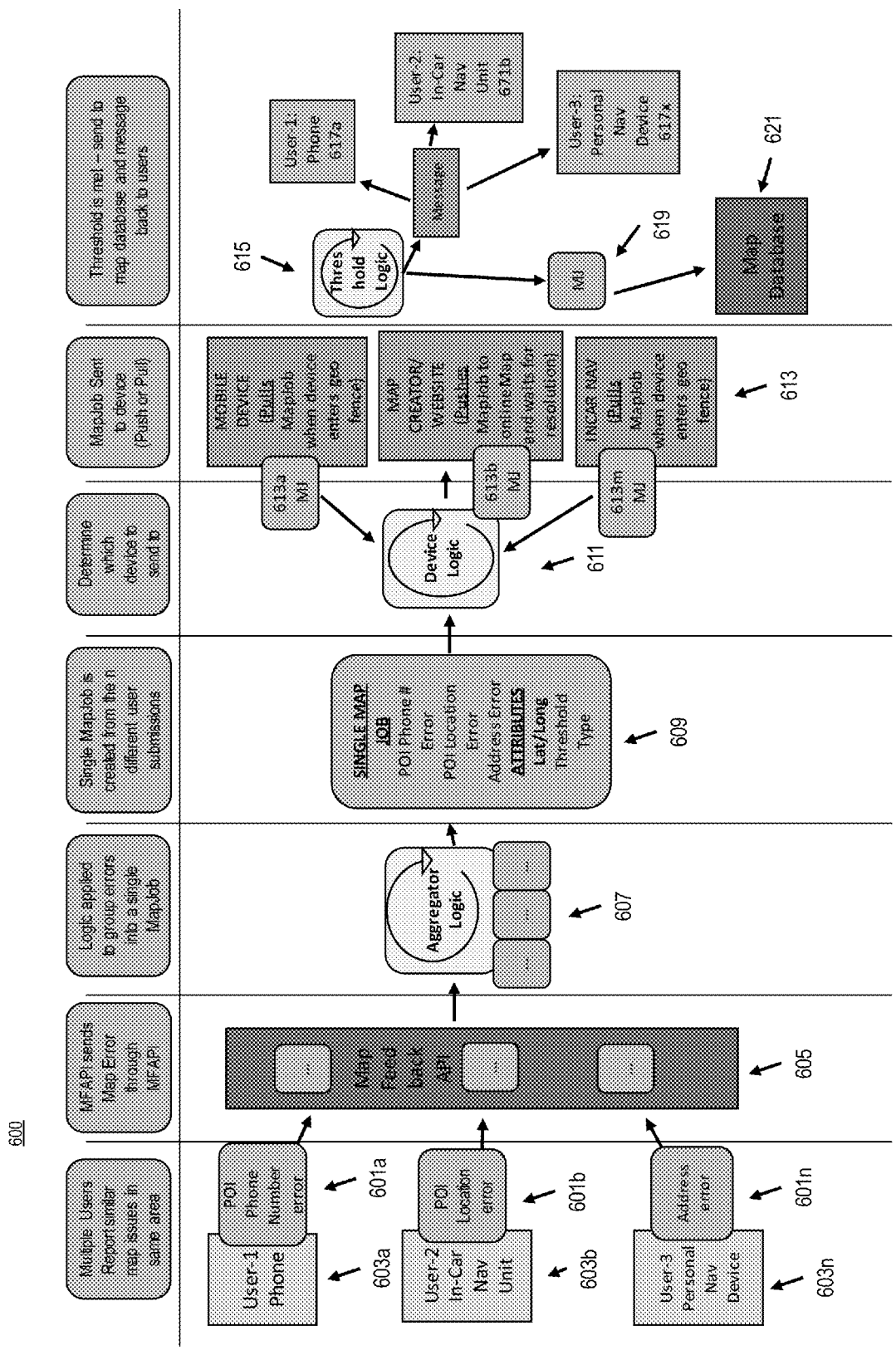
FIG. 6 illustrates an example process flow for resolving map data errors, according to one embodiment.

FIG. 6 illustrates an example process flow for resolving map data errors, according to one embodiment.

In one embodiment, FIG. 6, a process 600 may include various sub processes for processing and resolving data errors 601a-601n (errors 601) that may be received from a plurality of users or user devices 603a-603n that request or wish to participate in providing the feedback. In various examples, the errors 601 may be for an erroneous or a missing information item, e.g., a POI phone number error, a POI location error on a map, a POI address error, or the like. In one embodiment, the errors 601 may be received via MFAPI 605 and input into an aggregator logic 607 for processing. In one embodiment, the aggregator may use a MJ creation flow that may include an analysis of each of the plurality of errors 601 for grouping the errors into one or more MJs. In various scenarios, the grouping of the errors may be based on an error type, geo-location associated with the error, reporting user or user device, validation threshold rating, priority, or the like. In this example, a single MJ 609 is created, wherein the each error 601 is listed along with one or more attributes, e.g., latitude, longitude, threshold, and type of error.

In one embodiment, a device logic 611 to determine which user devices a MJ should be distributed or made available to. For example, the device or distribution logic may create a list/queue of MJs that can be distributed to users or service providers for consideration or completion. In various scenarios, an MJ may be pulled/requested by a user device 613a (e.g., a mobile device) or 613m (e.g., an in-car navigation system), or an MJ may be pushed/distributed to a device or website 613b (e.g., a map creator). In one embodiment, an MJ may be associated with a geo-location attribute, wherein the system 100 may also determine a geo-fence attribute for the MJ. In one scenario, an MJ may indicate that for updating/validating an error in the MJ, a user/user-device is to be at the same geo-location as indicated by the MJ or be within its geo-fence attribute. In one embodiment, an MJ is presented at a user device only when location information of the user device is substantially the same as the geo-location attribute of the MJ or when the user device is located within the geo-fence attribute (e.g., within one mile) of the MJ. In one embodiment, MJs may be distributed (e.g., pushed) to one or more user devices, wherein the MJs may be queued to be resolved.

In one embodiment, a threshold/validation logic 615 may monitor or receive responses for resolving an MJ, where the responses may be received from various users devices 617a-617x. In one embodiment, the threshold logic may process and compare an MJ resolution data against a threshold logic to determine that the MJ has been resolved. In one embodiment, threshold logic includes, at least in part, one or more rules, one or more criteria, or a combination thereof for determining that the at least one map job has been resolved. In one embodiment, a plurality of resolution data instances may be compared to each other in order to determine if they match. In one embodiment, the threshold logic may cause a communication to the one or more devices that the MJ has been resolved. In one embodiment, the signaling initiates a removal of the MJ 619 for one or more queues, wherein the MJ may be tagged as resolved or the MJ and related individual error reports may be automatically closed. In one embodiment, a notification of a resolution may be communicated to one or more users who had reported the error. For example, the communication may be via an SMS message, an Internet link, a prompt via one or more applications at a UE 101 (e.g., application 103, validation manager 105, etc.), or the like. Additionally, the corrected/updated data may be uploaded to a map database 621, wherein the feedback data utilized in resolving the MJ may be stored at one or more data stores.

Figure 7A:
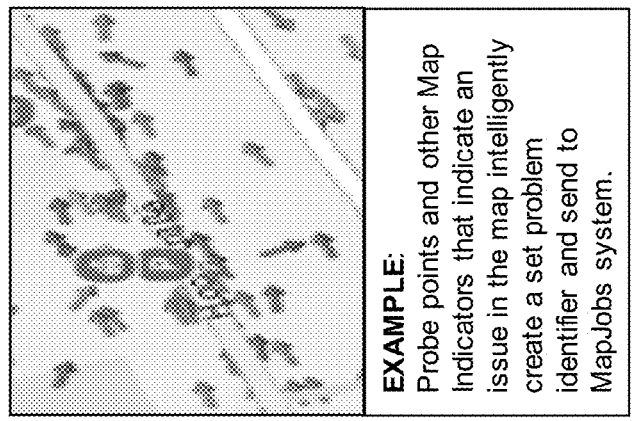
FIGS. 7A and 7B illustrate example user interface diagrams utilized in the processes of the FIGS. 4 through 6, according to various embodiments.
Figure 7A:
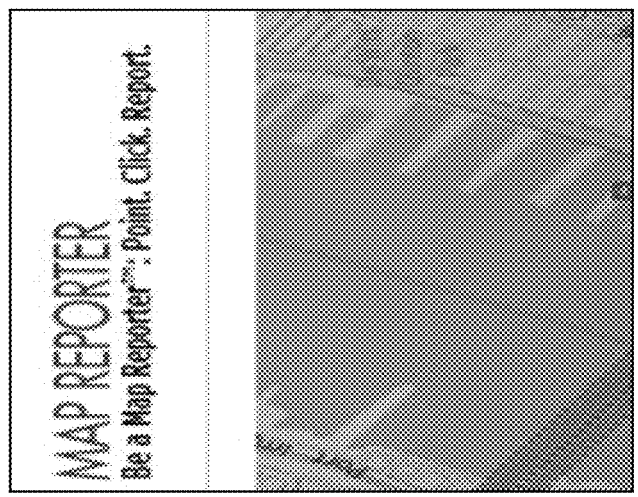
Figure 7A:
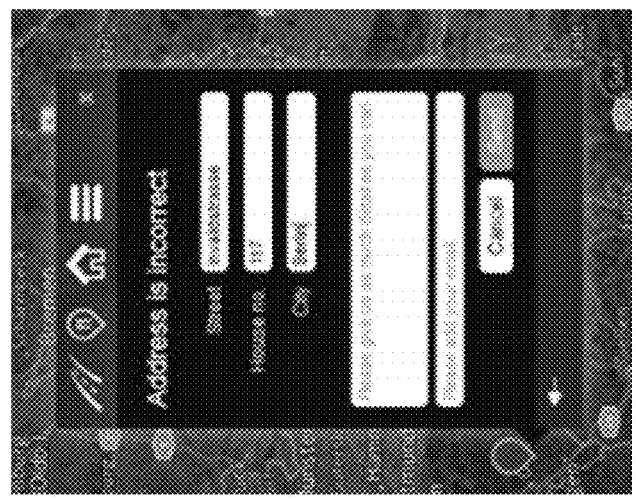
Figure 7B:
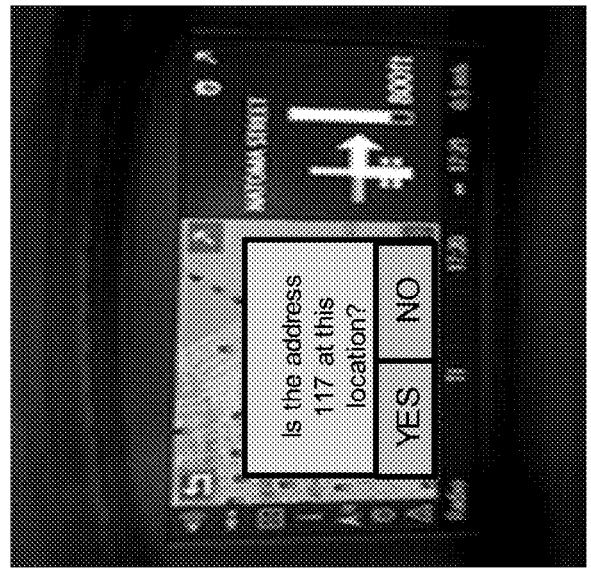
Figure 7B:
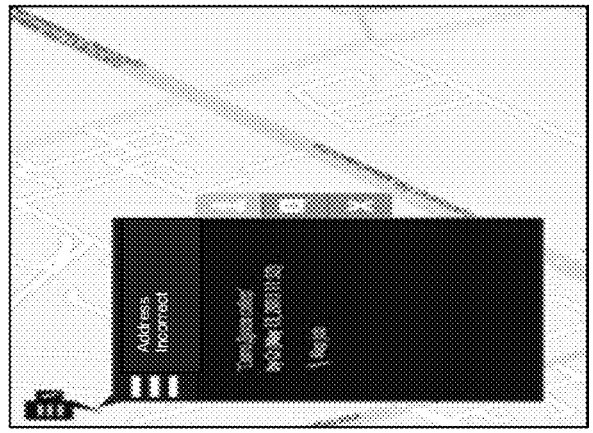
Figure 7B:
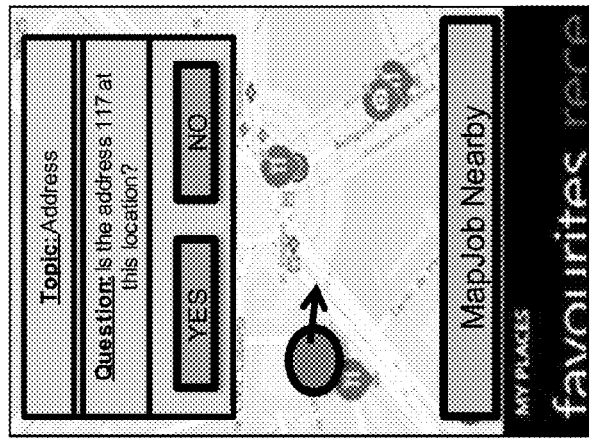

FIGS. 7A and 7B illustrate example user interface diagrams utilized in the processes of the FIGS. 4 through 6, according to various embodiments.

FIG. 7A includes diagrams 700, 710, and 720, which may be utilized in reporting data errors. In one scenario, the diagrams 700 depicts a UI at a user device with a MFAPI that can be used to report an error associated with a POI or any data instance that may be available via one or more applications at a UE 101. For example, diagram 700 illustrates a report indicating that there may be an error with a physical address of a POI (e.g., a house address). In one scenario, the diagram 710 illustrates a UI utilized in a map application (e.g., a map reporter) to report an error, wherein the map utility may include an API (MapAPI) for interfacing with and providing the report to a validation platform. In another scenario, the diagram 720 depicts an error report that was generated (e.g., substantially automatically) by a map system that captured the data error.

FIG. 7B includes UI diagrams 730, 740, and 750, which may presented at different various user devices for presenting any of the MJs illustrated in the diagrams 700, 710, and 720. For example, the UI 730 may be presented at a UE 101, the UI 740 may be presented at a website, and the UI 750 may be presented at a navigation system of an automobile. However, any UI may be designed and presented at any device based on the device or service provider requirements and expectations. In the example UIs of 730, 740, and 750 a user may interact with the presented information or prompts, wherein the user may or may not accept to interact with a presented MJ.

Figure 8:
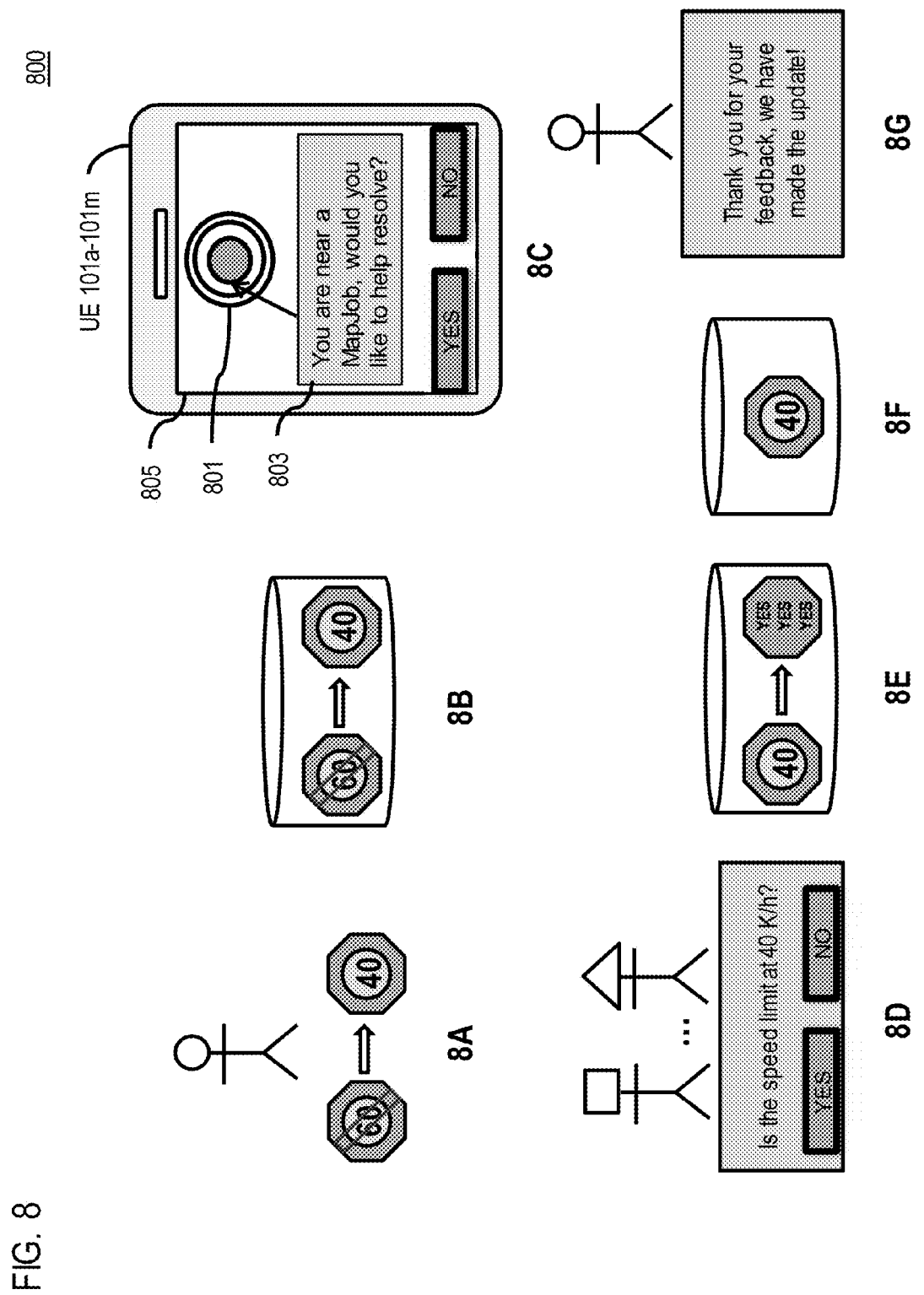
FIG. 8 includes illustration of a mapjob flow process, according to one embodiment.

FIG. 8 includes illustration of a mapjob flow process, according to one embodiment. In one embodiment, process 800 includes receiving a data error report, at step 8A, from user-X indicating that there may be an error with information on a speed limit at a given location (e.g., along a certain segment of a freeway). For example, user-X may have noticed the speed limit presented in a map application or a navigation system in his automobile. At step 8B, the validation platform may log the error report and create an MJ for distribution to one or more users. At step 8C, the validation platform may determine that one or more user devices UE 101a-101m of one or more users 1-m is near the location 801 where the error report is associated with. In one example, a UE 101 may be a registered user device, which previously has been used to provide feedback on previous data error reports. In one scenario, the validation platform may cause a presentation of a message 803 via UI 805 of a UE 101, where the message may enquire if user-1 of the UE 101a may wish to help to resolve an MJ that is nearby, e.g., 801. In this example, the user-1 accepts the task to provide one or more information items or a response to a potential question. At step 8D, the user-1 may be presented with a question "Is the speed limit at 40K/h?" that is related to the speed limit error reported by user-X. At step 8E, a response or other information provided by user-1 is logged into the database, and steps 8C-8D may be repeated as many times as necessary to meet a threshold logic, which would indicate that the resolution data provided by the users are validated. In this example, the threshold logic is set at three, and as the number of agreeing responses "YES" reach that level, the validation platform may validate the speed limit resolution at 40 K/h and update the database at step 8F. At step 8G, the validation platform may close the MJ and notify user-X that the data error, which user-X reported has been resolved and updated.

The processes described herein for validating crowd-sourced information may be advantageously implemented via software, hardware, firmware, or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
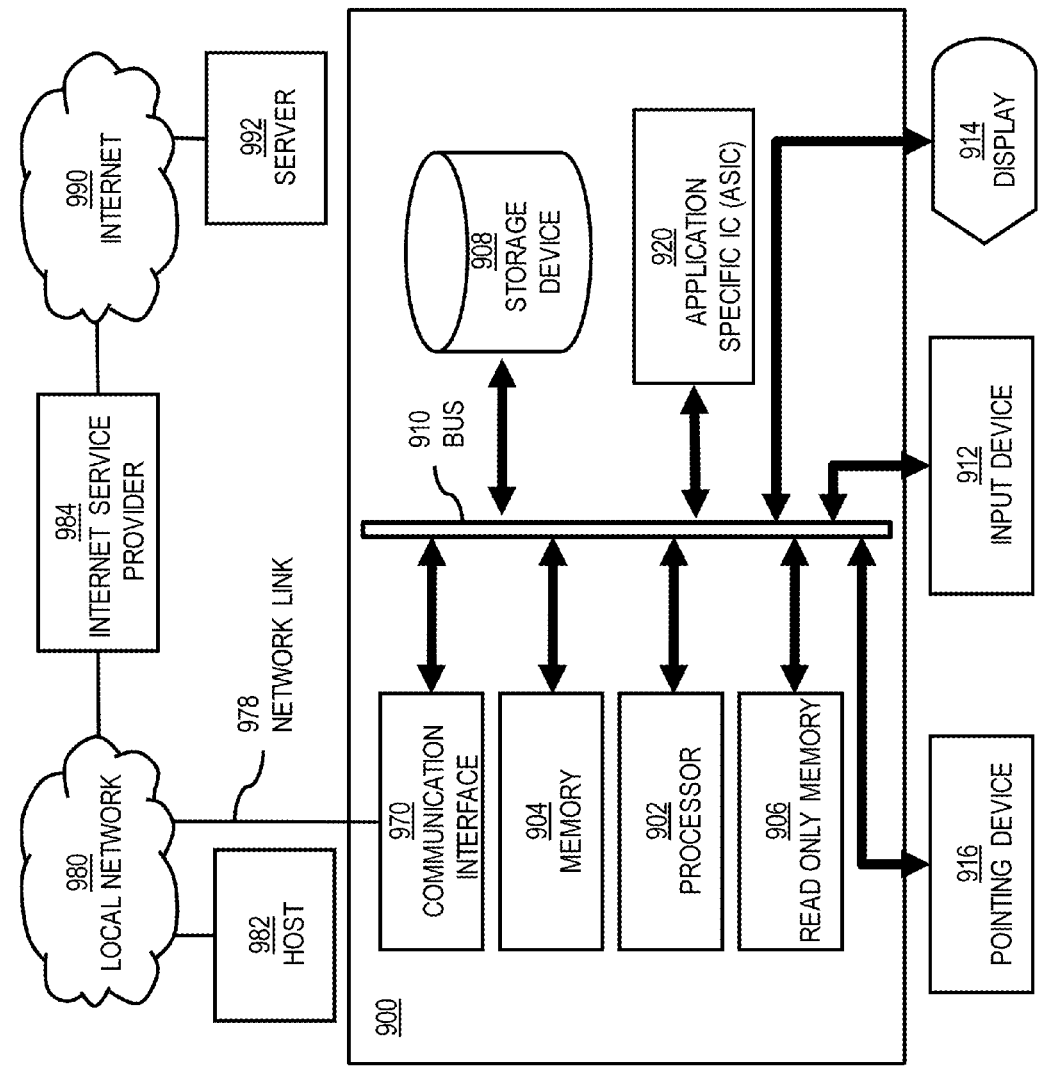
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to validate crowd-sourced information as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of validating crowd-sourced information.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to validating crowd-sourced information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for validating crowd-sourced information. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for validating crowd-sourced information, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914, and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners, and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic, or electromagnetic signals, including infrared and optical signals that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 117 for validating crowd-sourced information.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980, and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed for validating crowd-sourced information as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of validating crowd-sourced information.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to validate crowd-sourced information. The memory 1005 also stores the data associated with or generated by the execution of the inventive steps.

Figure 11:
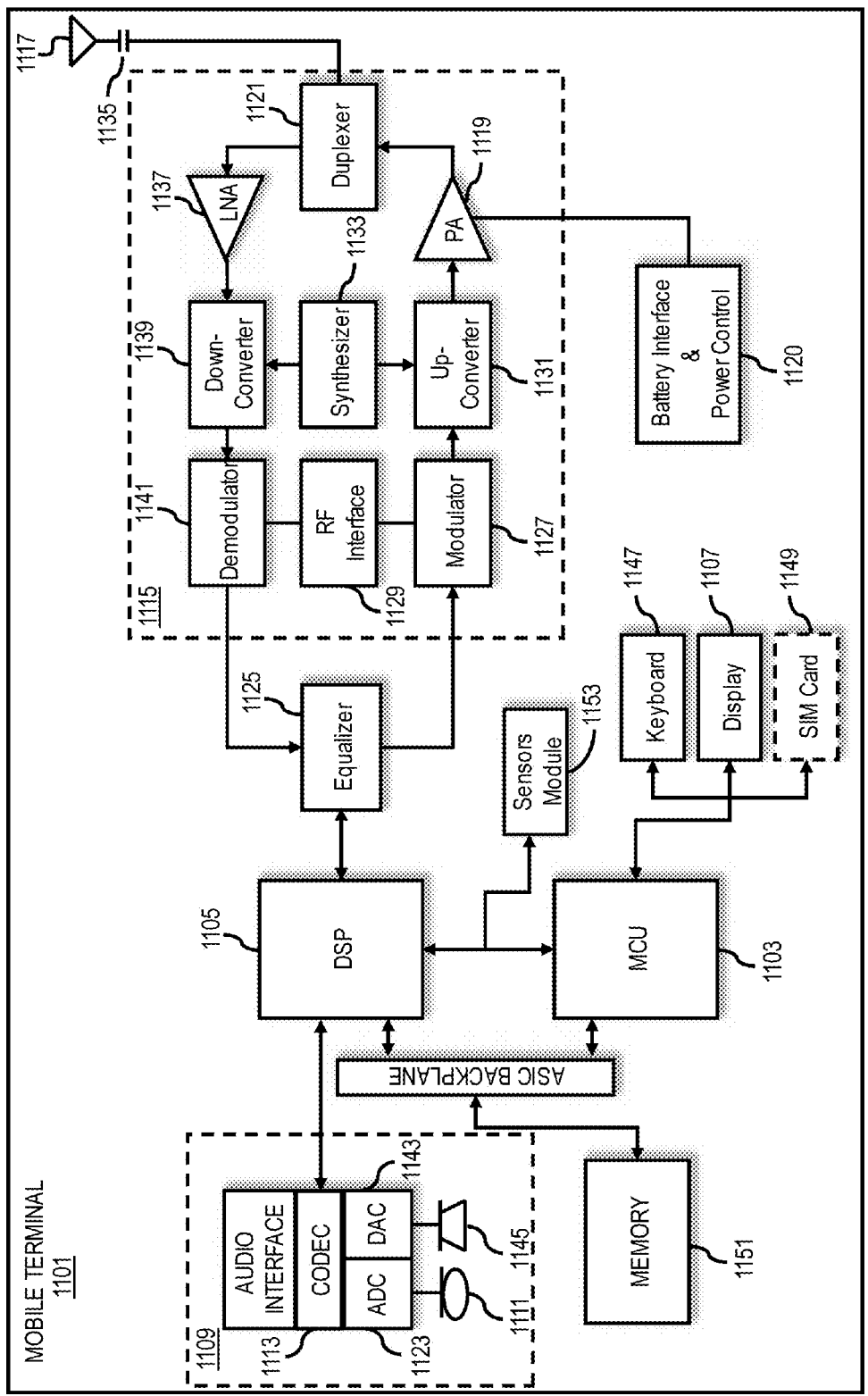
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of validating crowd-sourced information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of validating crowd-sourced information. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 for validating crowd-sourced information. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Additionally, sensors module 1153 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1101 (e.g., a mobile phone), a user of the mobile terminal 1101, an environment of the mobile terminal 1101 and/or the user, or a combination thereof, wherein the data may be collected, processed, stored, and/or shared with one or more components and/or modules of the mobile terminal 1101 and/or with one or more entities external to the mobile terminal 1101.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    generating, by an apparatus, at least one map data update task and at least one activity context associated with the at least one map data update task based on map error data, map request data, or a combination thereof, received via a network from devices;
    determining, by the apparatus, at least some of the devices to transmit the at least one map data update task based on the at least one activity context, wherein the some of the devices include a plurality of user devices;
    initiating, by the apparatus, a transmission of the at least one map data update task with an award tag to the some of the devices;
    receiving, at the apparatus, responses to the at least one data update task from the some of the devices, wherein the responses to the at least one data update task include one or more phone numbers associated with a point of interest, one or more internet links associated with the point of interest, or a combination thereof;
    comparing, by the apparatus, the responses against one another to meet at least one threshold logic that determines the at least one map data update task has been resolved; and
    adding, by the apparatus, awards to user accounts associated with the some of the devices based on the award tag and reliability of the responses in resolving the at least one map data update task, wherein the awards include credit points,
    wherein the at least one activity context includes a mode of transportation,
    wherein the at least one map data update task includes, at least in part, geo-fencing information for triggering a presentation of the at least one map data update task at the some of the devices, and
    wherein the some of the devices for transmitting the at least one map data update task are further determined based on device capabilities of the some of the devices, schedules of the users, or a combination thereof.

2. The method of claim 1, wherein the credit points are determined further based on user trust levels, corrected error types, a priority of corrected errors, or a combination thereof.

3. The method of claim 1, wherein the map error data includes map error reports from the devices, the map request data includes requests for missing map information items from the devices, and the method further comprising:
    initiating a clustering of the map error reports, the missing map information items, or a combination thereof, based on the at least one activity context, geo-location data, or a combination thereof to generate the at least map data update task, wherein the geo-location data is associated with the map error reports, the missing map information items, or a combination thereof.

4. The method of claim 1, wherein the at least one threshold is based, at least in part, on a predetermined number of matched responses to the at least one data update.

5. The method of claim 1, wherein the responses to the at least one data update task include, at least in part, image data, video data, audio data, or a combination thereof to confirm that the at least one map data update task has been resolved, and
    wherein the award tag includes an award amount, a priority level, and an expiration time.

6. The method of claim 1, wherein the responses to the at least one data update task include location information of another point of interest in the area, and the method further comprising:
    initiating a signaling of at least the some of the devices that the at least one map data update task has been resolved.

7. The method of claim 6, wherein the signaling initiates a removal of the at least one map data update task from at least one task queue of the some of the devices.

8. The method of claim 4, further comprising:
    determining the threshold logic based on a map error type, the at least one activity context, trust level information associated with the some of the devices, or a combination thereof.

9. The method of claim 4, wherein the at least one threshold logic includes, at least in part, one or more rules, one or more criteria, or a combination thereof for determining that the at least one map data update task has been resolved.

10. An apparatus comprising:
    at least one processor; and
    at least one memory including computer program code for one or more programs,
    the at least one memory and the computer program code configured to, with the at least one processor, cause the apparatus to perform at least the following,
        generate at least one map data update task and at least one activity context associated with the at least one map data update task based on map error data, map request data, or a combination thereof, received via a network from devices;
        determine at least some of the devices to transmit the at least one map data update task based on the at least one activity context, wherein the some of the devices include a plurality of user devices;
        initiate a transmission of the at least one map data update task with an award tag to the some of the devices;
        receive responses to the at least one data update task from the some of the devices, wherein the responses to the at least one data update task include one or more phone numbers associated with a point of interest, one or more internet links associated with the point of interest, or a combination thereof;
        compare the responses against one another to meet at least one threshold logic that determines the at least one map data update task has been resolved; and
        add awards to user accounts associated with the some of the devices based on the award tag and reliability of the responses in resolving the at least one map data update task, wherein the awards include credit points,
        wherein the at least one activity context includes a mode of transportation,
        wherein the at least one map data update task includes, at least in part, geo-fencing information for triggering a presentation of the at least one map data update task at the some of the devices, and
        wherein the some of the devices for transmitting the at least one map data update task are further determined based on device capabilities of the some of the devices, schedules of the users, or a combination thereof.

11. The apparatus of claim 10, wherein the at least one activity context includes, at least in part, a mode of transport, an activity associated with at least one user of the devices, or a combination thereof.

12. The apparatus of claim 10, wherein the at least one threshold logic is based on a predetermined number of matched responses to the at least one data update task.

13. The apparatus of claim 12, wherein the apparatus is further caused to:

initiate a signaling of at least the some of the devices that the at least one map data update task has been resolved.

14. The apparatus of claim 13, wherein the signaling initiates a removal of the at least one map data update task from at least one task queue of the some of the devices.

15. The apparatus of claim 12, wherein the apparatus is further caused to:

determine the threshold logic based on a map error type, the at least one activity context, trust level information associated with the some of the devices, or a combination thereof.

16. A non-transitory computer program product including one or more sequences of one or more instructions which, when executed by one or more processors, cause an apparatus to at least perform:

generating at least one map data update task and at least one activity context associated with the at least one map data update task based on map error data, map request data, or a combination thereof, received via a network from devices;

determining at least some of the devices to transmit the at least one map data update task based on the at least one activity context, wherein the some of the devices include a plurality of user devices;

initiating a transmission of the at least one map data update task with an award tag to the some of the devices;

receiving responses to the at least one data update task from the some of the devices, wherein the responses to the at least one data update task include one or more phone numbers associated with a point of interest, one or more internet links associated with the point of interest, or a combination thereof;

comparing the responses against one another to meet at least one threshold logic that determines the at least one map data update task has been resolved; and adding awards to user accounts associated with the some of the devices based on the award tag and reliability of the responses in resolving the at least one map data update task, wherein the awards include credit points, wherein the at least one activity context includes a mode of transportation, wherein the at least one map data update task includes, at least in part, geo-fencing information for triggering a presentation of the at least one map data update task at the some of the devices, and wherein the some of the devices for transmitting the at least one map data update task are further determined based on device capabilities of the some of the devices, schedules of the users, or a combination thereof.

17. The non-transitory computer program product of claim 16, wherein the at least one activity context includes, at least in part, a mode of transport, an activity associated with at least one user of the devices, or a combination thereof.

* * * * *